Figure 1:
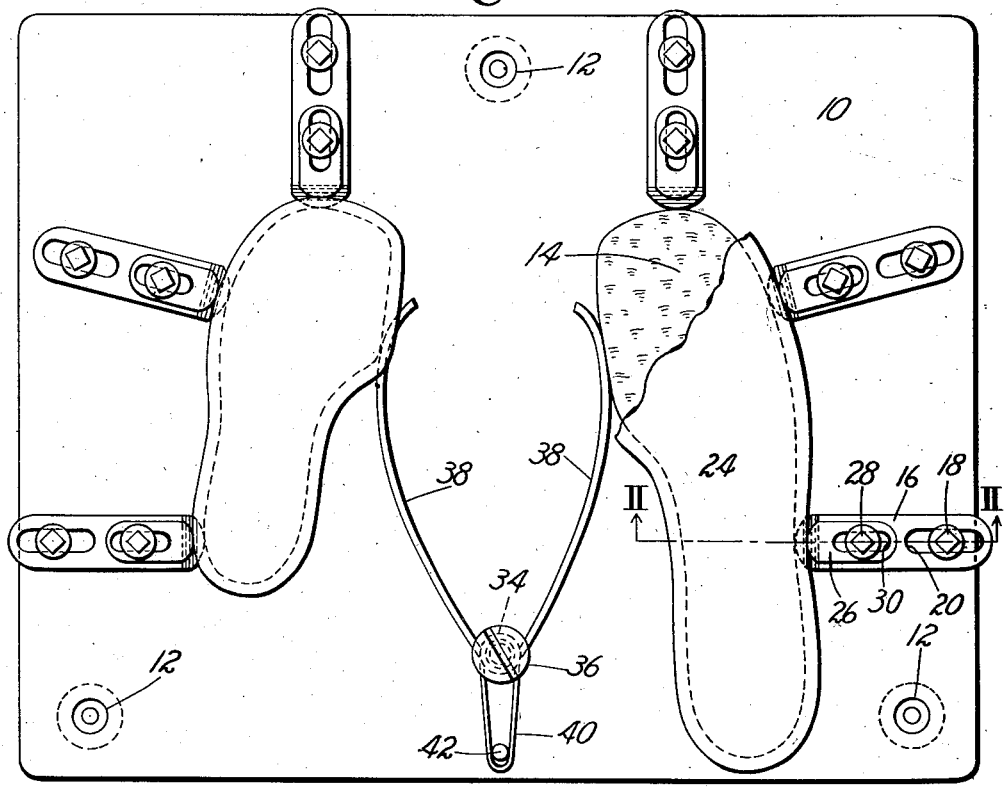

Aug. 22, 1944.	E. L. BUTLER	2,356,213

EDGE GAUGING MECHANISM

Filed April 21, 1943

INVENTOR
Ernest L. Butler
By his attorney

Patented Aug. 22, 1944

2,356,213

UNITED STATES PATENT OFFICE 2,356,213

EDGE GAUGING MECHANISM

Ernest Lindon Butler, Lynn, Mass., assignor to United Shoe Machinery Corporation, Flemington, N. J., a corporation of New Jersey Application April 21, 1943, Serial No. 483,918

7 Claims. (Cl. 12—17)

This invention relates to edge gauging means and is herein illustrated in its application to means for use in assembling fillers and insoles for use in prewelt shoes.

It is a usual practice in the manufacture of prewelt shoes to assemble the insole and the filler and to secure them together by means of an adhesive before mounting them on the last bottom for assembly with the prewelt upper. It is desirable that the welted margin of the upper be wiped over the margin of the insole and against the edge face of the filler in the lasting operation in order that the welt and the filler may provide a continuous uninterrupted surface for attachment to the outsole. In order to achieve this result it is necessary that the filler be located on the insole with a high degree of accuracy in order that the distance between the edge face of the filler and the edge face of the insole at any point in the periphery of the insole may correspond exactly to the extent of overwipe to be given to the welted margin of the upper.

It is an object of the present invention to provide gauging means which may be relied upon to locate the filler and insole accurately in superposed relation one to the other. It will be understood that the utility of such a gauging means is not limited to its use in the manufacture of prewelt shoes since such a mechanism would obviously be useful in assembling shoe parts other than insoles and fillers used in prewelt shoemaking.

To this end the present invention in one aspect thereof comprises means for use in assembling shoe parts in superposed relation one to another, comprising a work supporting plate, an edge gauging assembly mounted on said plate and arranged to engage a work piece, pressure-applying means for holding said work piece against said edge gauging assembly, said pressure-applying means comprising a torsion spring having an extended leg arranged to engage the edge face of said work piece, and means for positioning another part in superposed relation to said work piece. In another aspect thereof, the invention comprises a duplex organization which consists of two edge gauging assemblies and a double acting spring positioned between said assemblies for holding work pieces in edge gauging position. The use of such an organization enables the shoemaker to permit the work to remain in edge gauging position relatively to one of said assemblies while positioning another set of work parts relatively to the other gauging assembly. This is advantageous in instances where the shoemaking method requires the parts to be cement attached to each other in the assembling operation, the time interval permitting the cement to set sufficiently to insure the retention of the shoe parts in assembled position after they are removed from the edge gauges.

These and other features of the invention will now be described with reference to the accompanying drawing and pointed out in the appended claims.

Figure 2:
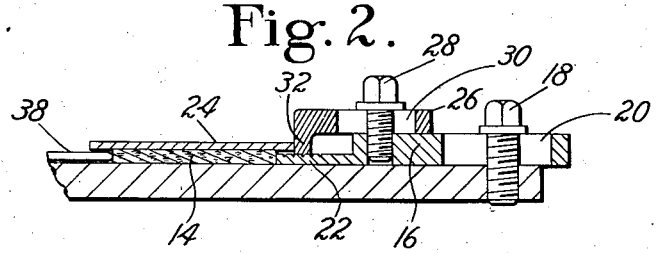

In the drawing,

Fig. 1 is a plan view illustrating an assembly embodying the features of this invention; and Fig. 2 is a section on the line II—II of Fig. 1.

The invention is herein illustrated in its application to means for gauging the assembled position of fillers and insoles for use in prewelt shoes in children's sizes from 1 to 12.

Referring to Fig. 1, the illustrated gauging means comprises a plate 10 which provides the work-supporting portion of a duplex organization comprising two edge gauging assemblies and means positioned between said assemblies for holding work pieces in edge-gauging position. Said plate is preferably secured to a bench or table by fastenings 12 and has mounted thereon two separate edge-gauging assemblies each comprising three gauging units, one arranged to engage the toe end portion of the sole members, another the forepart, and the third the heel or the shank portion, depending upon the size of the sole members. The plate 10 separately supports two fillers one at each side of its central portion, as shown in Fig. 1, the respective positions of said fillers, and of the insoles mounted in superposed relation thereon, being determined by their three-point contact with the gauging units. As shown in Fig. 1, the gauging units are positioned adjacent to the edge of the plate 10, the fillers being held in contact with said gauging units by a centrally located pressure-applying means hereinafter described.

The six gauging units being identical, the following description of the unit shown in section in Fig. 2 will suffice for all. For gauging the position of a filler, for example the cork filler 14 illustrated in the drawing, a gauge plate 16 is secured to the plate 10 by a headed clamping screw 18 extending through a longitudinal slot 20 in the gauge plate, said slot affording longitudinal adjustment of the gauge plate. The work-engaging portion 22 of the gauge plate 16 is reduced to a thickness slightly less than the thickness of the filler 14 in order to permit the margin of an insole, for example the insole 24 illustrated in the drawing, to overlie the end portion of the gauge plate. For gauging the position of the insole relatively to the filler, a second gauge plate 26 is secured to the gauge plate 16 by a headed clamping screw 28 positioned in a slot 30 extending longitudinally of the gauge plate 26, said slot affording longitudinal adjustment of the gauge plate 26 relatively to the gauge plate 16. The left end portion of the gauge plate 26 has a downwardly-extending flange 32 the outer surface of which serves as the work-engaging portion of said gauge plate. As shown in Fig. 1, said work-engaging surface is convexly shaped, as is also the work-engaging end face of the gauge plate 16, such convex curvature obviating the engagement of sharp angular portions of the gauge members with the work. To assist in locating the gauge plate 26 relatively to the gauge plate 16 and in securing said plates in adjusted position, the upper surface of the reduced portion of the gauge plate 16 has formed therein a plurality of teeth arranged to extend widthwise of said plate, and the end face of the flange 32 has similar teeth formed therein. When the gauge plate 26 is secured to the gauge plate 16 by the clamping screw 28, said teeth are brought into locking engagement with each other, as shown in Fig. 2, and assist in holding the gauge plate 26 in its predetermined position on the plate 16.

For holding the filler in its position of three-point contact with the gauging plates 16, the plate 10 is provided with a double-acting pressure-applying means herein illustrated as a torsion spring 34 coiled about a headed screw 36 secured in the plate 10 at a point centrally located between its side edges. The end portions of the torsion spring are extended upwardly and outwardly, providing legs 38, the convexly-bent end portions of which are arranged to engage respectively fillers at opposite sides of the plate 10. For positioning the legs 38 centrally with relation to the side edges of the plate 10, one convolution of the torsion spring 34 is constructed and arranged to form a loop 40 through which extends a locating pin 42.

In assembling fillers and insoles with the aid of the illustrated gauging means, the filler 14 is laid flat against the plate 10 in a convenient position between the gauge plates 16 and the adjacent leg 38 of the torsion spring and is advanced into its position of three-point contact with the convex end faces of said gauge plates, in which position it is yieldingly held by the torsion spring. While in this position, the filler may be coated with a suitable adhesive, if adhesive has not already been applied thereto, and, thereupon, the insole 24 is placed upon the filler and located relatively thereto by bringing the edge of the insole into three-point contact with the convex gauging surfaces of the gauge plates 26. The insole is then pressed or pounded against the filler to cement attach said members together and, thereupon, the insole and filler assembly is slid heelwardly along the surface of the plate 10 to disengage it from the gauging elements and the torsion spring. If desired, the assembled insole and filler may be permitted to remain on the plate 10 while another insole and filler are assembled at the opposite side of the plate, thereby providing an interval of time for the cement to set sufficiently to insure the retention of the insole and filler in assembled position after they are removed from the plate 10.

While the two gauging assemblies are herein illustrated as arranged to operate on right and left shoe parts, respectively, it will be understood that they may be so adjusted that they will both operate on rights or both on lefts as may be desired.

The provision for individual adjustment of each of the insole-gauging plates 26 relatively to the filler-gauging plates 16 enables the shoe manufacturer to obtain a feather margin in the insole and filler assembly of the width which he considers best suited to his work and also to vary the width of said feather margin at different parts of the insole and filler assembly as may be desired. It will be understood that, in the illustrated insole and filler assembly, the so-called "feather margin" is the exposed marginal surface of the insole between the edge of the insole and the edge face of the filler.

Having thus described my invention, what I claim as new and desire to secure by Letters Patent of the United States is:

1. Means for use in assembling two work pieces in superposed relation one to the other, comprising a work supporting plate, an edge gauging assembly mounted on said plate arranged to engage a work piece, pressure applying means for holding said work piece against said edge gauging assembly, said pressure-applying means comprising a torsion spring having an extended leg arranged to engage the edge face of said work piece, and means for positioning another part in a superposed relation to said work piece.

2. Means for use in assembling shoe parts in superposed relation, one to another, comprising a work supporting plate, only three edge gauging units for positioning said shoe parts on said plate, one of said units contacting an end portion and the other two units contacting one side portion of said shoe parts, and providing a three-point contact for said shoe parts arranged to locate them in a predetermined position on said work supporting plate and in predetermined relation to each other, and pressure-applying means for holding one of said shoe parts against the three edge gauging units, said pressure-applying means comprising a torsion spring having an extended leg arranged to engage a mid-portion of said shoe part.

3. A duplex organization for use in assembling shoe parts in superposed relation one to another, comprising two edge gauging assemblies, and a double-acting spring positioned between said assemblies for holding shoe parts in edge gauging position.

4. A duplex organization for use in assembling shoe parts in superposed relation one to another, comprising two edge gauging assemblies, and resilient means positioned between said assemblies for holding shoe parts in edge gauging position, said means comprising a torsion spring terminating in diverging legs constructed and arranged to engage two shoe parts positioned in gauging relation to said two gauging assemblies, respectively.

5. Duplex means for use in assembling shoe parts in superposed relation one to another, comprising a work supporting plate for supporting two shoe part assemblies at opposite sides thereof, two edge gauge assemblies mounted on opposite marginal portions of said plate, and a single pressure applying means mounted on the central portion of said plate and constructed and arranged to press the two shoe part assemblies outwardly against said edge gauges.

6. Duplex means for use in assembling shoe parts in superposed relation one to another, comprising a plate for supporting two shoe part assemblies at opposite sides thereof, two edge gauge assemblies mounted on opposite sides of said plate, each of said edge gauge assemblies comprising three edge gauge units, one contacting an end portion of said shoe parts and the other two contacting that side portion adjacent to the edge of said plate, and a single pressure applying means mounted on the central portion of said plate and constructed and arranged to press both shoe part assemblies outwardly against said edge gauges.

7. Duplex means for use in assembling two sole members in superposed relation, one to the other, comprising a plate for separately supporting two sole members at opposite sides thereof, two edge gauge assemblies for positioning said sole members on said plate, each assembly comprising three edge gauge units, one contacting an end portion of a sole member and the other two contacting that side of said sole member adjacent to the edge of the work supporting plate, pressure applying means mounted on the central portion of said plate and constructed and arranged to press said sole members outwardly against said edge gauges, and means at each side of said plate for gauging the position of a second sole member arranged in superposed relation to the sole member mounted on the plate.

ERNEST LINDON BUTLER.